United States Patent
Chen et al.

(10) Patent No.: US 9,880,769 B2
(45) Date of Patent: Jan. 30, 2018

(54) STREAMING JOINS IN CONSTRAINED MEMORY ENVIRONMENTS

(71) Applicant: Microsoft Technology Licensing, LLC, Redmond, WA (US)

(72) Inventors: Zhong Chen, Medina, WA (US); Lev Novik, Bellevue, WA (US); Boris Shulman, Bellevue, WA (US); Clemens A. Szyperski, Sammamish, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 38 days.

(21) Appl. No.: 14/732,374

(22) Filed: Jun. 5, 2015

(65) Prior Publication Data
US 2016/0357476 A1   Dec. 8, 2016

(51) Int. Cl.
*G06F 3/06* (2006.01)
*G06F 17/30* (2006.01)

(52) U.S. Cl.
CPC .......... *G06F 3/0638* (2013.01); *G06F 3/0604* (2013.01); *G06F 3/0653* (2013.01); *G06F 3/0673* (2013.01); *G06F 17/30289* (2013.01)

(58) Field of Classification Search
CPC .... G06F 3/0638; G06F 3/0604; G06F 3/0653; G06F 3/0673
USPC ....................................................... 711/154
See application file for complete search history.

(56) References Cited

U.S. PATENT DOCUMENTS

| | | | |
|---|---|---|---|
| 5,625,788 A | 4/1997 | Boggs et al. |
| 5,721,855 A | 2/1998 | Hinton et al. |
| 5,889,982 A | 3/1999 | Rodgers et al. |
| 6,449,618 B1 | 9/2002 | Blott et al. |
| 6,516,310 B2 | 2/2003 | Paulley |

(Continued)

FOREIGN PATENT DOCUMENTS

| | | |
|---|---|---|
| WO | 2014052917 A1 | 4/2014 |
| WO | 2015070232 A1 | 5/2015 |

OTHER PUBLICATIONS

"Azure Stream Analytics Developer Guide", Retrieved on: Apr. 8, 2015 Available at: http://azure.microsoft.com/en-in/documentation/articles/stream-analytics-developer-guide/, 9 pages.

(Continued)

*Primary Examiner* — Gary Portka (57) ABSTRACT

Large amounts of memory can be consumed in streaming joins because events from one stream are held in memory while waiting for matching events from a second stream. Memory needs can be reduced by analyzing the join condition to determine the bounds on the time discrepancy between events in the two streams. When it is determined that an event from one stream must occur prior to the matching event from the other stream, the later-arriving stream data can be ingested with an intentional delay. When it is determined that regardless of input received from a first stream, no output will be produced when there is no input from the second stream, pulling data from the first stream can cease. A multi-stage join plan can be employed so that a less busy stream can be scanned with increasing amounts of intentional delay. Only unmatched data is stored.

20 Claims, 6 Drawing Sheets

(56) References Cited

U.S. PATENT DOCUMENTS

| | | | |
|---|---|---|---|
| 6,625,150 | B1 | 9/2003 | Yu |
| 6,820,121 | B1 | 11/2004 | Callis et al. |
| 7,010,538 | B1* | 3/2006 | Black .............. G06F 17/30516 707/636 |
| 7,251,747 | B1 | 7/2007 | Bean et al. |
| 7,603,488 | B1 | 10/2009 | Gravenstein et al. |
| 7,680,830 | B1 | 3/2010 | Ohr et al. |
| 7,738,380 | B1 | 6/2010 | Dubrovsky et al. |
| 8,001,309 | B2 | 8/2011 | Patzelt et al. |
| 8,219,848 | B2 | 7/2012 | Branson et al. |
| 8,392,381 | B2 | 3/2013 | Al-Kateb et al. |
| 8,417,690 | B2 | 4/2013 | Poppe et al. |
| 8,797,867 | B1 | 8/2014 | Chen et al. |
| 8,812,487 | B2 | 8/2014 | Krishnamurthy et al. |
| 8,949,194 | B1 | 2/2015 | Mehlum et al. |
| 8,949,801 | B2 | 2/2015 | Andrade et al. |
| 2002/0010804 | A1 | 1/2002 | Sanghvi et al. |
| 2005/0281279 | A1 | 12/2005 | Dennison et al. |
| 2006/0143170 | A1 | 6/2006 | Ganguly et al. |
| 2006/0195309 | A1 | 8/2006 | Stokkan et al. |
| 2006/0004597 | A1 | 12/2006 | Charters |
| 2008/0005391 | A1 | 1/2008 | Gedik et al. |
| 2008/0270640 | A1 | 10/2008 | Gedik et al. |
| 2009/0157895 | A1* | 6/2009 | Van Den Berghe . H04N 21/222 709/231 |
| 2010/0254462 | A1 | 10/2010 | Friedrich et al. |
| 2012/0005564 | A1 | 1/2012 | Tsubaki |
| 2013/0132978 | A1 | 5/2013 | Opher et al. |
| 2013/0166617 | A1 | 6/2013 | Branson et al. |
| 2014/0016501 | A1 | 1/2014 | Kamath et al. |
| 2014/0201225 | A1 | 7/2014 | Deshmukh et al. |
| 2014/0215184 | A1 | 7/2014 | Branson et al. |
| 2014/0226469 | A1 | 8/2014 | Chen et al. |
| 2015/0134796 | A1 | 12/2015 | Theimer et al. |

OTHER PUBLICATIONS

"International Search Report and Written Opinion Issued in PCT Application No. PCT/US2016/035610", Mailed Date: Sep. 5, 2016, 13 Pages.

Gedik, et al., "GrubJoin: An Adaptive, Multi-Way, Windowed Stream Join with Time Correlation-Aware CPU Load Shedding", In Proceedings of IEEE Transactions on Knowledge and Data Engineering, vol. 19, Issue 10, Oct. 2, 2007, pp. 1363-1380.

Xie, et al., "A Survey of Join Processing in Data Streams.", In Proceedings of Springer Data Streams, vol. 31, Apr. 2, 2007, pp. 209-236.

Babu, et al., "Exploiting k-Constraints to Reduce Memory Overhead in Continuous Queries over Data Streams", In Proceedings of ACM Transactions on Database Systems (TODS), vol. 29 Issue 3, Sep. 2004, 28 pages.

Ding, et al., "MJoin: A Metadata•Aware Stream Join Operator", In Proceedings of the 2nd International Workshop on Distributed Event-Based Systems, Jun. 8, 2003, 8 pages.

Dash, et al., "Delivering QOS in Xml Data Stream Processing Using Load Shedding", In Proceedings of International Journal of Database Management Systems, vol. 4, Issue.3, Jun. 2012, 23 pages.

Gu, et al., "Adaptive Load Diffusion for Stream Joins", In Proceedings of the ACM/IFIP/USENIX International Conference on Middleware, Nov. 2005, 10 pages.

Ananthanarayanan, et al., "Photon: Fault-tolerant and Scalable Joining of Continuous Data Streams", In Proceedings of ACM SIGMOD International Conference on Management of Data, Jun. 22, 2013, 12 pages.

Asha, et al., "Adaptive Join Operators for Result Rate Optimization on Streaming Inputs", In Proceedings of International Journal of Engineering Trends and Technology, May 2011, 5 pages.

"SAS® Event Stream Processing Engine", Published on: Nov. 12, 2014 Available at: http://www.sas.com/content/dam/SAS/en_us/doc/factsheet/event-stream-processing-engine-106151.pdf, 4 pages.

Li, et al., "Event Stream Processing with Out-of-Order Data Arrival", In Proceedings of the 27th International Conference on Distributed Computing Systems Workshops, Jun. 22, 2007, 8 pages.

Keckler, et al., "Concurrent Event Handling Through Multithreading", In Proceedings of IEEE Transactions on Computers, vol. 48, Issue 9, Sep. 1999, 14 pages.

Heinze, et al., "Latency-Aware Elastic Scaling for Distributed Data Stream Processing Systems", In Proceedings of the 8th ACM International Conference on Distributed Event-Based Systems, May 26, 2014, 10 pages.

Francisci Morales, Gianmarco De, "Distributed Stream Processing Showdown: S4 vs Storm", Published on: Jan. 2, 2013 Available at: http://gdfm.me/2013/01/02/distributed-stream-processing-show-down-s4-vs-storm/, 5 pages.

Akidau, et al., "MillWheel: Fault-Tolerant Stream Processing at Internet Scale", In Proceedings of the VLDB Endowment, vol. 6, Issue 11, Aug. 26, 2013, 12 pages.

Hwang, et al., "High-Availability Algorithms for Distributed Stream Processing", In Proceedings of the 21st International Conference on Data Engineering, Apr. 5, 2005, 12 pages.

Hu, et al., "ELF: Efficient Lightweight Fast Stream Processing at Scale", In Proceedings of USENIX ATC Annual Technical Conference, Jun. 19, 2014, 13 pages.

Brito, et al., "Scalable and Low-Latency Data Processing with Stream MapReduce", In Proc IEEE Third International Conference on Cloud Computing Technology and Science, Nov. 29, 2011, 15 pages, 11 pages.

Hwang, et al., "A Comparison of Stream-Oriented High-Availability Algorithms", In Technical Report, Jun. 5, 2003, 13 pages.

Kamburugamuve, Supun, "Survey of Distributed Stream Processing for Large Stream Sources", In Technical Report, Dec. 14, 2013, 16 pages.

"Samza", Retrieved on: Jun. 5, 2015, Available at: http://samza.apache.org/learn/documentation/0.7.0/container/checkpointing.html, 4 pages.

Bockermann, Christian, "A Survey of the Stream Processing Landscap", In Technical Report, May 16, 2014, 47 pages.

Branson, et al., "CLASP: Collaborating, Autonomous Stream Processing Systems", In Proceedings of ACM/IFIP/USENIX 8th International Middleware Conference, Nov. 26, 2007, 20 pages.

Liu, et al., "SAND: A Fault-Tolerant Streaming Architecture for Network Traffic Analytics", In Proceedings of 44th Annual IEEE/IFIP International Conference on Dependable Systems and Networks, Jun. 23, 2014, 8 pages.

Srivastava, et al., "Memory-Limited Execution of Windowed Stream Joins", In Proceedings of the Thirtieth International Conference on Very Large Databases, vol. 30, Aug. 31, 2004, pp. 324-335.

Das, et al., "Approximate Join Processing Over Data Streams", In Proceedings of the ACM SIGMOD International conference on Management of Data, Jun. 9, 2003, pp. 40-51.

"International Preliminary Report on Patentability Issued in PCT Application No. PCT/US2016/035610", dated May 29, 2017, 7 Pages.

"USPTO Final Office Action", dated Jul. 7, 2017, U.S. Appl. No. 14/732,398, filed Jun. 5, 2015, pp. 37.

"USPTO Non-Final Office Action", dated Jan. 25, 2017, U.S. Appl. No. 14/732,398, filed Jun. 5, 2015, pp. 30.

"International Search Report and Written Opinion Issued in PCT Application No. PCT/US2016/035611", dated Sep. 14, 2016, 15 Pages.

"USPTO Non-Final Office Action", dated Apr. 7, 2017, U.S. Appl. No. 14/732,416, filed Jun. 5, 2015, pp. 8.

Mumian, et al., "Introduction to Azure Stream Analytics", http://azure.microsoft.com/en-us/documentation/articles/stream-analytics-introduction/, Retrieved on: Mar. 1, 2016, 4 Pages.

Sattler, et al., "Towards Elastic Stream Processing: Patterns and Infrastructure", In Proceedings of the First International Workshop on Big Dynamic Distributed Data, Aug. 30, 2013, 6 Pages.

\* cited by examiner

STREAMING JOINS IN CONSTRAINED MEMORY ENVIRONMENTS

CROSS-REFERENCE TO RELATED APPLICATIONS

The application is related in subject matter to co-pending U.S. patent application Ser. No. 14/732,398 entitled "HANDLING OUT OF ORDER EVENTS", filed on Jun. 5, 2015. The application is related in subject matter to co-pending U.S. patent application Ser. No. 14/732,416 entitled "USING ANCHORS FOR RELIABLE STREAM PROCESSING", filed on Jun. 5, 2015.

BACKGROUND

In traditional computing a single central processing unit (CPU) sequentially executes a single instruction on a single piece of data in a single stream, executing one operation at a time. As the data processing demands of the world increased, the amount of data to be operated upon exploded.

In stream processing multiple data streams from potentially multiple sources can be processed in real time. "Streaming" or stream processing means receiving streams of data, processing the data and streaming it back out as a single flow of data. Large amounts of memory and/or other resources can be consumed when joining multiple data streams because data from one data stream typically is held in memory or on a storage medium while waiting for matching events from another data stream to arrive.

SUMMARY

The one or more join conditions specifying allowable joins (matching data) of data from two or more data streams can be analyzed to determine a time period for allowable joins (a time discrepancy between times associated with the joinable data). Increasing the time period for which data matches can result in the reduction of the amount of memory or storage needed for joining because stream data does not have to be stored. If analysis of the allowable bounds determines that, in order to match up, an event from one stream must occur prior to the matching event from another stream, the later-arriving stream data can be ingested with an intentional delay.

When analysis of the join conditions at run-time indicates that regardless of input received through one of the data streams (e.g., a first data stream), no output will be produced unless and until more input is received from the other data stream, (e.g., a second data stream) pulling data from the first stream can cease until more input is received from the second data stream. A multi-stage join plan having multiple allowable join time periods can be employed. One (e.g., typically less busy) stream can be scanned with increasing amounts of intentional delay (e.g. at time 0, and time 0 plus 1 minute, at time 0 plus 5 minutes, at time 0 plus 10 minutes and so on). Rather than holding the entire contents of the other (e.g., typically busier) data stream for the match interval, the events that were not matched within a specified time period can be re-pulled from the first data stream during a second stage.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

A common scenario in stream processing is "joining" two or more streams. For example a join of two data streams typically generates a data stream of pairs: data from the first data stream, and data from the second data stream, where the pair satisfies the conditions specified in the join. Conserving resources such as memory or storage when computing joins is helpful in traditional database processing and can be even more helpful in stream processing.

Three strategies for joins in stream processing that can dramatically reduce memory and/or storage requirements are described. One reason that large amounts of memory and/or storage are often consumed in streaming joins is because data from one data stream is held in memory or storage while waiting for matching events from a second data stream to arrive. To alleviate this condition, in accordance with aspects of the first strategy, the join condition can be analyzed to determine an allowable time range for joinable data, or in other words, the time discrepancy between data in the two data streams that "match" (e.g., satisfy the join condition). For example, if ascertaining the lower boundary of the allowable time range determines that, in order to match, data from one data stream must occur prior to matching data from the other data stream, the later-arriving stream data can be ingested with an intentional delay. An intentional delay means that data associated with a time X is not ingested from the second stream until data with time X+T is ingested from the first stream, where T is the lower boundary of the allowable time range. Typically in traditional stream processing systems, ingestion occurs as fast as possible. The memory and/or storage requirements for the joining process can be reduced by not holding the data from the earlier-arriving stream in memory and/or storage. Interestingly, this technique does not increase latency.

A second strategy analyzes the join condition to determine when the internal state of the join operator is such that no matter how much additional input is received through one of the streams (e.g., a second data stream), no output will be produced. This condition will typically but not always occur when the buffer for the first input data stream is empty. In such cases, in accordance with some aspects of the subject matter, no additional input is sought from the second input data stream, as it would only serve to increase the memory and/or storage consumption.

In a third strategy a multi-stage join plan can be employed. A first data stream can be scanned with typically one or more increasing amounts of intentional delay (e.g. at time 0, and time 0 plus 1 minute, at time 0 plus 5 minutes, at time 0 plus 10 minutes and so on). In accordance with aspects of the subject matter described herein, rather than holding the entire contents of either data stream for the match interval in memory (as would be required in some known state-of-the-art join plans), only the events that were not matched within a specified time period are held. This strategy works particularly well when the maximum time differences between matching events is much larger than the average time difference between matching events—a very common situation in stream joins. The strategies described herein can be combined in any combination.

Streaming Joins in Constrained Memory Environments

Figure 1:
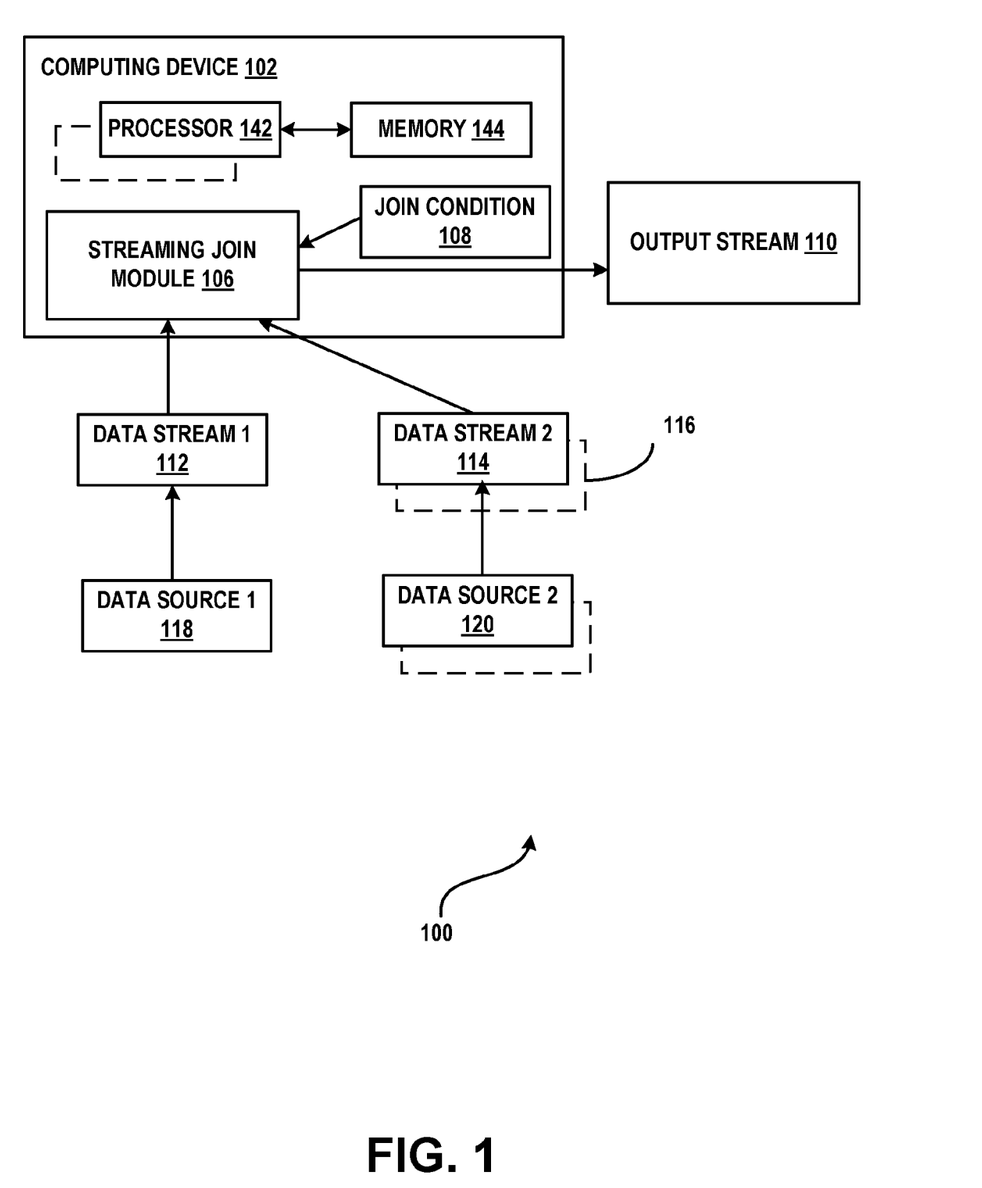
FIG. 1 illustrates a system 100 comprising an example of a system that performs streaming joins in accordance with aspects of the subject matter described herein.

FIG. 1 illustrates an example of a system 100 that performs streaming joins in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

System 100 can include one or more computing devices such as, for example, computing device 102. Contemplated computing devices include but are not limited to desktop computers, tablet computers, laptop computers, notebook computers, personal digital assistants, smart phones, cellular telephones, mobile telephones, sensors and so on. A computing device such as computing device 102 can include one or more processors such as processor 142, etc., and a memory such as memory 144 that communicates with the one or more processors. The computing device may be a device that operates in a constrained memory environment. A constrained memory environment is an environment in which the available memory is not sufficient to handle the processing demands with which it is faced using more traditional techniques of processing streaming joins.

System 100 may include any one or more program modules that when loaded into the memory cause the at least one processor to perform the processing attributed to the one or more program modules. System 100 may include any one or more program modules comprising: one or more program modules that perform streaming joins such as streaming join module 106. System 100 may include one or more join conditions that describe the conditions under which data can be allowably joined, represented in FIG. 1 as join condition 108. A join condition may be a query. A join condition may be a portion of a query. The query may be a database query. The query may be a non-database query. Streaming join module 106 may receive two or more data streams such as a first data stream (e.g., data stream 1 112) and a second stream (e.g., data stream 2 114). One or more additional data streams may also be received and joined, represented in FIG. 1 by data stream 116. Data in the data streams may be event data, complex event data, data from databases or any type of data. Streaming data can be structured data, security data, sensor data, measurement data, (e.g., data from a temperature sensing device), log data and so on.

Streaming join module 106 may join data from two or more data streams to produce an output stream such as output stream 110. Data from data streams can be real time data received in real time. Data from data streams can be recorded real time data. Data from the first data stream may originate from a first data source (e.g., data source 1 118). Data from a second data stream may originate from a second data source (e.g., data source 1 120) and so on. Data sources may reside on the same computing device as streaming join module 106 or on a different computing device. Similarly, a first data source and a second data source of more than two data streams may reside on the same computing device, on different computing devices and so on. Data from the two or more data streams can be joined in accordance with join conditions as determined by conditions set forth in a join conditions data store (not shown). Streaming join module 106 may process one or more of the streaming join strategies described below.

One streaming join strategy applies to temporal joins. Data from two or more data streams can be joined in accordance with a time associated with the data. The time associated with the data can be a time at which the data was generated. The time associated with the data can be a time at which the data was received. The time associated with the data can be a time at which the data was sent. The time associated with the data can be any other time. In the examples below data is joined in relation to when the data was generated. In accordance with some aspects of the subject matter described herein, an assumption is made that the data is received in order by time. For example, an event may be time stamped to reflect the time at which the event was generated.

Streaming join module 106 can acquire data from the data streams by acquiring, accessing, reading or pulling data. In accordance with some aspects of the subject matter, streaming join module 106 can pull data for the streaming joins so that data is not received until requested by the streaming join module. The streaming join module 106 can pull data from the first data stream at one time. The streaming join module 106 can pull data from the second data stream another time that is earlier or later than the time the data is pulled from the first data stream. If there are more than two data streams, the other data streams can be pulled from at still different times. The streaming join module 106 can generate an order (sequence) in which pull requests are sent to the data streams based on the times associated with the data from the data streams, thereby determining which data stream will be pulled from next. The streaming join module 106 can make a determination of which data stream to pull from next using the following methodology. If the time associated with the first unit of data, record or event in the first data stream is greater than the time associated with the second unit of data, record or event in the second data stream, the streaming join module 106 can stop pulling data from the first data stream until the time associated with the data of the first data stream is equal to or greater than the data being processed in the second data stream and vice versa.

For example, suppose the streaming join module 106 is given a join with the condition that only matches events with identical timestamps. The streaming join module can pull data from data stream 1. Suppose the first event in data stream 1 has a timestamp of time (t)+8. The streaming join module can then request data from data stream 2. Suppose the first event in data stream 2 has a timestamp of t+0. The streaming join module 106 can store the timestamp (t+8) of the event of the first data stream 1 (data stream 1) having the later associated time and stop pulling data from data stream 1 until the timestamp of the event being processed from data stream 2 reaches or exceeds the stored timestamp (t+8). Thus, in this example, instead of storing eight events from data stream 1 until the event in data stream 2 with a timestamp of t+8 or greater is reached, only one value is stored in memory.

In the example above, the assumption was made that data with timestamp equivalence were joined. That is, data from data stream 1 with a timestamp of t+1 was joined with data from data stream 2 with a timestamp of t+1. However, such is not always the case. A join condition may specify that data with an associated time that falls within a specified range or time period can be joined. The join condition can be analyzed to determine what the time range for allowably joining data is. For example, the join condition may specify that data from data stream 1 and data from data stream 2 can be joined as long as the time associated with the data from data stream 2 exceeds the time associated with the data from data stream 1 by a time range generated from the join condition, such as, for example, between 10 and 20 seconds. In this case, the streaming join module can introduce an intentional delay into the pulling of data from data stream 1 by the lower bound of the time range (e.g., 10 seconds), because no event from data stream 1 can successfully match an event from data stream 2 until the time associated with the data from data stream 2 is at least the lower bound (10 seconds) ahead of the time associated with the data from data stream 1. When the input stream is a recorded data stream, "delay" can mean skipping to the data having an associated time that satisfies the join condition rather than actually waiting 10 seconds. Delay can also mean a suspension of pulling data.

Time ranges can be extracted from the join condition using methods that depend on the language used to specify those conditions. In accordance with some aspects of the subject matter described herein, the join conditions are specified using binary logic over binary Boolean expressions. In such a system, the range can be extracted by the following sequence of steps, performed recursively:
1) Convert the join condition to its Disjunctive Normal Form.
2) If the top-most operator in the condition is an AND, extract the ranges from its two arguments, and intersect them.
3) If the top-most operator in the condition is an OR, extract the ranges from its two arguments, and union them, taking the convex hull of the result.
4) If the top-most operator in the condition is a NOT, extract the range of its argument and take its complement, taking the convex hull of the result.
5) If the top-most operator in the condition is a comparison operator, then:
a. Check if all of the arguments on the left-hand side reference the first stream's associated time or are constants, and if all of the arguments on the right-hand side reference the second stream's associated time or are constants, extract the bound on the difference between the associated times implied by this expression.
b. Otherwise, return a completely open range.

The second streaming join strategy applies to joins in which output data is only produced when data from one data source is only generated when a particular condition exists or a particular threshold is reached. In some circumstances, the join condition can be analyzed at runtime. In response to determining that regardless of the input generated by a first data source, no input is being generated from the second data source, no input from the first data source is sought. For example, the join condition may specify that data from data stream 1 can only match data from data stream 2 if both their associated times and their user names match. When a large number of records with a given time are ingested from one data stream (e.g., data stream 1), while only a small number of records with the matching time are ingested from another data stream (e.g., data stream 2), the ingestion of data from one data stream (e.g., data stream 1) can be suspended until either (a) the other data stream (e.g., data stream 2) moves beyond the aforementioned matching time or (b) the number of units of data ingested from the other data stream (e.g., data stream 2) for the time reaches the number of units of data ingested from the one data stream (e.g., data stream 1).

The third streaming join strategy is a multiple-stage approach in which at least two time periods are applied to joins. In one (e.g., typically a shorter) time period, data from the first data stream and data from the second data stream are matched within the first time period. In accordance with some aspects of the subject matter described herein, any data from the second data stream that did not match data from the first data stream within the first (shorter) time period is retained or held (e.g., in memory), and is matched as the first stream is re-read (e.g., re-pulled) with one or more increasing delays reaching the second (larger) time period. It will be appreciated that the examples provided are meant to be illustrative, not limiting.

Figure 2A:
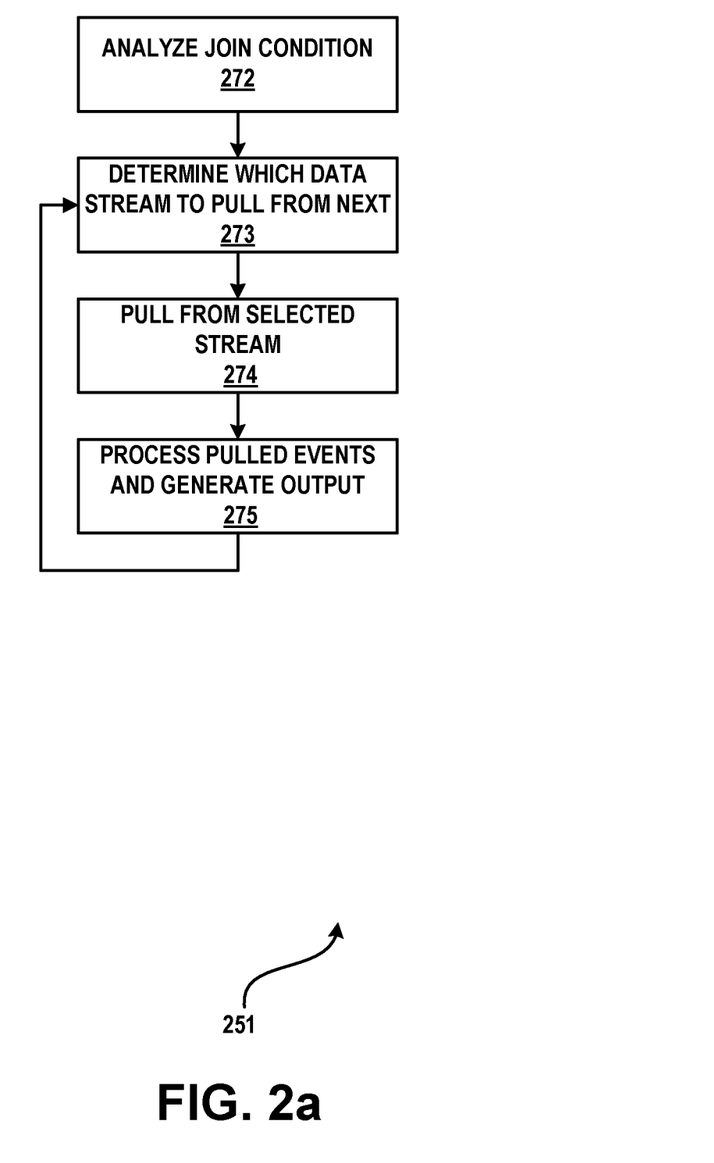
FIG. 2a illustrates an example of a method 251 for performing streaming joins in accordance with aspects of the subject matter disclosed herein.

FIG. 2a illustrates an example of a method 251 for performing streaming joins in accordance with aspects of the subject matter described herein. The method described in FIG. 2a can be practiced by a system such as but not limited to the one described with respect to FIG. 1. While method 251 describes a series of operations that are performed in a sequence, it is to be understood that method 251 is not limited by the order of the sequence depicted. For instance, some operations may occur in a different order than that described. In addition, one operation may occur concurrently with another operation. In some instances, not all operations described are performed. In some instances, not all operations performed are illustrated.

At operation 272 one or more join conditions can be analyzed. At operation 273 which data stream to pull from next can be determined. At operation 274 the selected data stream can be pulled from. At operation 275 the pulled data can be processed. Output can be generated.

Figure 2B:
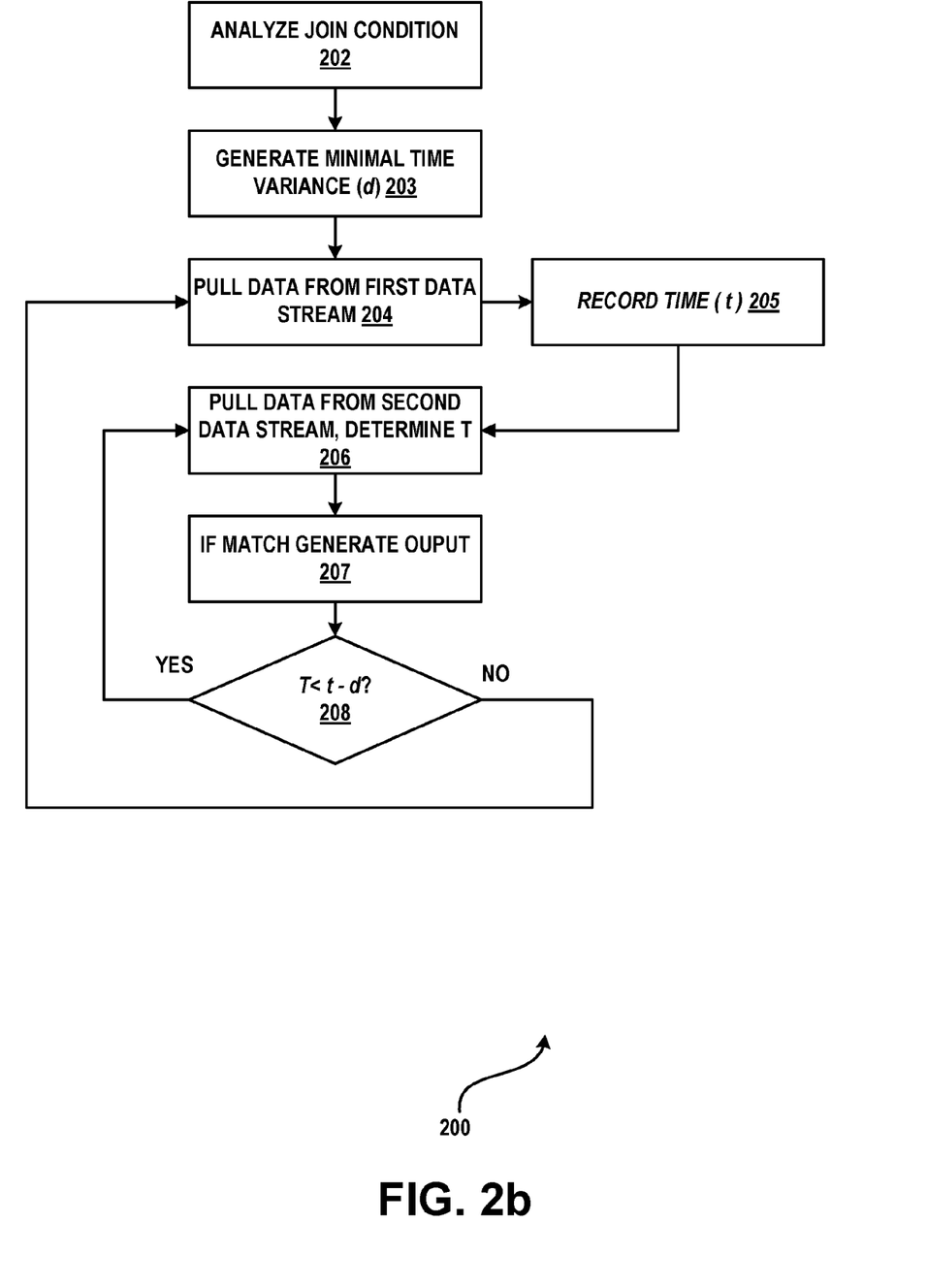
FIG. 2b illustrates an example of a another method 200 for performing streaming joins in accordance with aspects of the subject matter disclosed herein.

FIG. 2b illustrates an example of a method 200 for performing streaming joins in accordance with aspects of the subject matter described herein. The method described in FIG. 2b can be practiced by a system such as but not limited to the one described with respect to FIG. 1. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed. In some instances, not all operations performed are illustrated.

At operation 202 one or more join conditions can be analyzed. Analysis of the at least one join condition can provide information from which an allowable time discrepancy for matching data can be generated. At operation 203 a minimal time variance (e.g., time variance d) between matching (joinable) data (e.g., events) can be generated. That is, as described above, a join condition may specify that data associated with a time that falls within a specified range or time period can be joined. The join condition can be analyzed to determine what the time range for joining data is at operation 203. For example, the join condition may specify that data from data stream 1 and data from data stream 2 can be joined as long as the time associated with data pulled from data stream 2 exceeds the time associated with the data pulled from data stream 1 by between 3 and 5 seconds. The minimal time variance d is the lower end of the range: in this example, the minimal time variance d is 3 seconds, the lower end of the time period. Data associated with a time that is less than 3 minutes after the time associated with the data pulled from the first stream of data will not match because that data does not fall within the range of 3 and 5 minutes after the time associated with data pulled from the first stream of data and thus will not be joined. Data associated with a time that is greater than 5 minutes after the time associated with the data pulled from the first stream of data will not match because that data does not fall within the range of 3 and 5 minutes after the time associated with data pulled from the first stream of data and thus will not be joined.

At operation 204, data from a first data stream can be acquired, accessed, read or pulled from a first data source. At operation 205 the time associated with the pulled data t can be recorded. At operation 206 data from another (a second data stream) can be acquired, accessed, read or pulled from another data source (a second data source). The associated time of the data from the other data stream T can be determined. If the data meets the match criteria output can be produced at operation 207, output can be displayed, reported, sent to a requestor, etc. and processing can continue at operation 208. If the data does not meet the match criteria output will not be produced and operation can continue at operation 208. The results of determining whether the times associated with the data attempting to be matched fall within or outside of the joinable time range at operation 208 determines whether the next data stream read is data stream 1 or data stream 2. Results can be determined by evaluation of the expression $T<t-d$. If $T<t-d$ is true, the data is joinable and more data from the second data stream can be pulled next. If $T<t-d$ is false, the data is not joinable and more data from the first data stream can be pulled next. That is, if the time associated with the data from the second stream is less than a difference of the recorded time and the minimal time variance, data can be pulled from the second data stream. Processing can resume at operation 206 at which point additional data from the second data stream can be acquired, accessed, read or pulled. In response to determining that the times associated with the data attempting to be matched and joined fall outside of the joinable time period at operation 208, additional data can be acquired, accessed, read or pulled from the first data stream and processing can resume at operation 204. Operations 204 through 208 can continue until the stream processing is terminated.

Suppose, for example, that data from data stream 2 comprises data about when a computer is booted and data from data stream 1 comprises data about logging into the computer. Suppose a join condition is written to find all users that logged into a computer within 5 and 10 minutes after the computer was booted. Suppose the last login was 1:11. Suppose the last boot was at 1:05. If the last reboot occurred at T=1:05, 1:05 can be compared to 1:06, that is, 1:11-5 (recorded time of data t from data stream 1 minus the minimal variance time d generated from the analysis of the join condition) to determine which of the data streams to pull from next. Because 1:05 is less than 1:06 additional data can be accessed, read or pulled from the second data stream. Logins that match a recorded time of 1:11 are logins that occurred between 1:11 and 1:16. Therefore if the last login was 1:11 the latest reboot that could match would be 1:06. Thus there would be no need to read any more boots until another login was received.

Figure 2C:
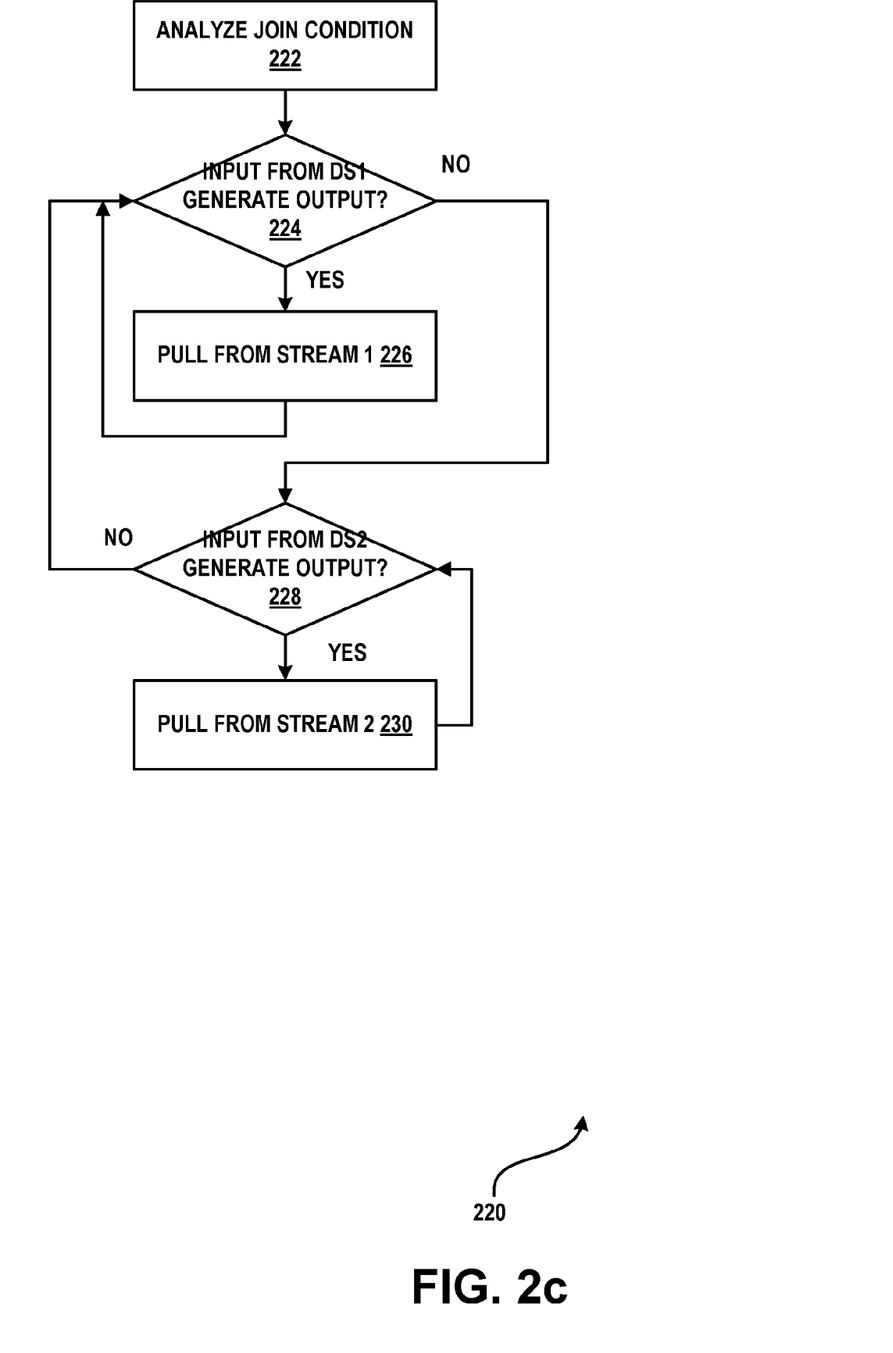
FIG. 2c illustrates an example of another method 220 for performing streaming joins in accordance with aspects of the subject matter disclosed herein.

FIG. 2c illustrates an example of a method 220 for performing streaming joins in accordance with aspects of the subject matter described herein. The method described in FIG. 2c can be practiced by a system such as but not limited to the one described with respect to FIG. 1. While method 220 describes a series of operations that are performed in a sequence, it is to be understood that method 220 is not limited by the order of the sequence depicted. For instance, some operations may occur in a different order than that described. In addition, one operation may occur concurrently with another operation. In some instances, not all operations described are performed. In some instances, not all operations performed are illustrated, At operation 222 one or more join conditions can be analyzed. In response to determining at operation 224 that, regardless of additional input received through one of the data streams (e.g., a first data stream), no output can be produced unless and until more input is received from the another data stream, (e.g., a second data stream) acquiring, accessing, reading, or pulling data from the first stream can cease until more input is received from the other (second) data stream. That is, in response to determining at operation 224 that no more potentially joinable input data from data stream 1 can be acquired until data from the second data stream is received, processing can continue at operation 228. Data that is potentially joinable data is data that has at least some chance of matching. If instead at operation 224 it is determined that additional still potentially joinable data is available from the first data stream (e.g., data stream 1) additional data can be acquired, accessed, read or pulled from the first data stream (e.g., data stream 1) at operation 226. Processing can return to operation 224. In response to determining at operation 228 that additional input from a second data stream (e.g., data stream 2) is still potentially joinable and thus can still potentially generate output, additional data can be pulled from data stream 2 at operation 230. Processing can return to operation 228. In response to determining at operation 228 that regardless of what additional input is received from data stream 2, output cannot be generated until additional data from the first data stream is received, processing can return to operation 224. This processing can continue until the stream processing process is terminated.

A real-world example of method 220 is described. Suppose a computer reboot occurring within 5 minutes before or 5 minutes after a temperature reading of 100 degrees Fahrenheit is detected. Typically a lot more temperature readings are generated then there are reboots. However, there is no point acquiring the temperature readings unless there is a reboot within the previous 5 minutes. Instead of acquiring and storing all the data, the data is not pulled in until the reboot occurs. For example, suppose the first data stream (data stream 1) represents temperature and the second data stream (data stream 2) represents reboots. At operation 224 a temperature reading is acquired but so far, no reboots have been received so no output can be generated. Additional temperature readings will not generate output, so no more temperature readings are pulled. Instead, data is attempted to be pulled from the second data stream (data stream 2). If data is acquired and if the match conditions are satisfied, output can be produced and more data can be pulled from data stream 2. As long as output can be generated, this loop continues. When output can no longer be generated (there are no reboots within the previous 5 minutes), processing returns to operation 224. This process can be repeated.

Figure 2D:
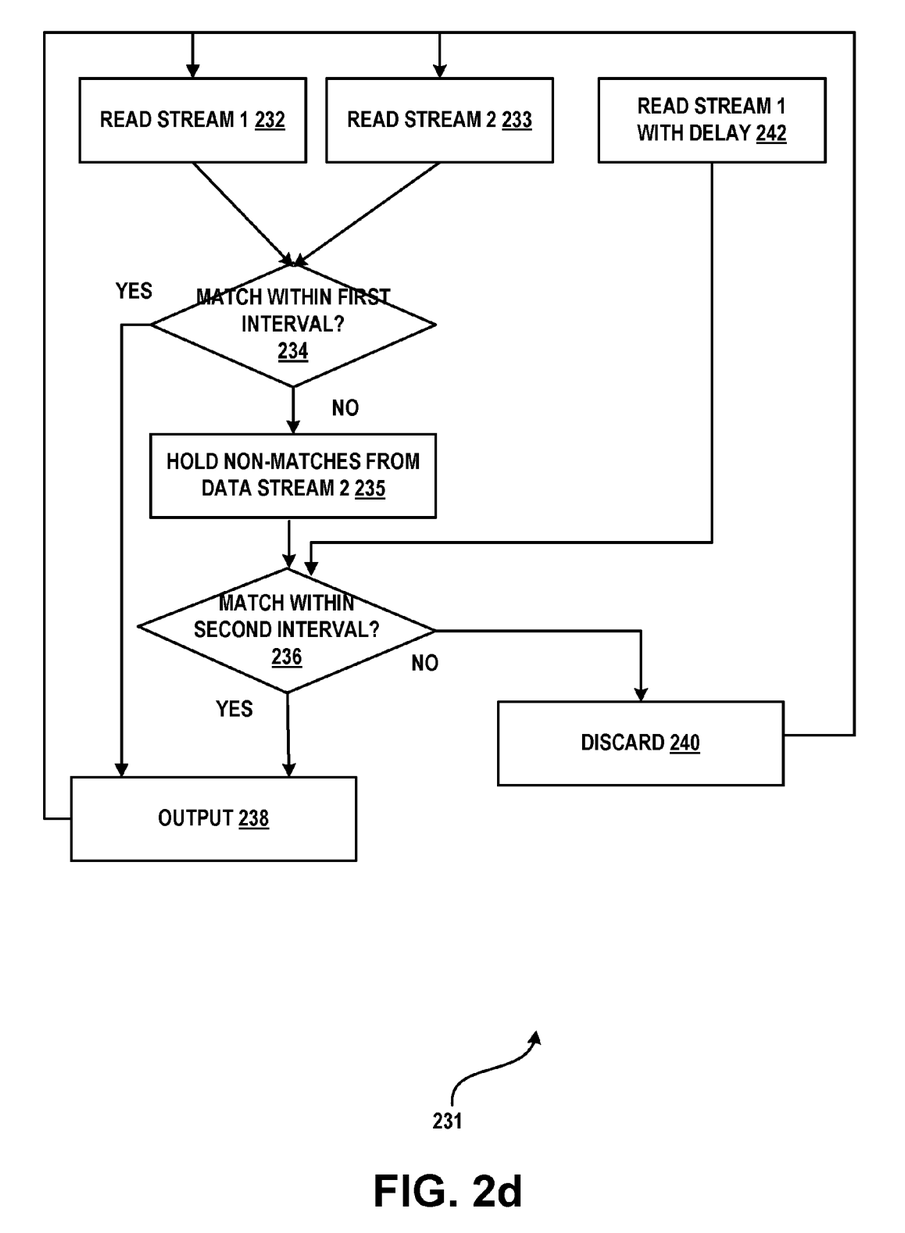
FIG. 2d illustrates an example of another method 231 for performing streaming joins in accordance with aspects of the subject matter disclosed herein.

FIG. 2d illustrates an example of a method 231 for performing streaming joins in accordance with aspects of the subject matter described herein. The method described in FIG. 2d can be practiced by a system such as but not limited to the one described with respect to FIG. 1. While method 231 describes a series of operations that are performed in a sequence, it is to be understood that method 231 is not limited by the order of the sequence depicted. For instance, some operations may occur in a different order than that described. In addition, one operation may occur concurrently with another operation. In some instances, not all operations described are performed. In some instances, not all operations performed are illustrated.

At least one join condition for joining data from a first stream and data from a second stream can be analyzed to generate at least a first time interval and a second time interval. In accordance with some aspects of the subject matter described herein, the first time interval is the shorter time interval of the two time intervals and the second time interval is the longer time interval of the two time intervals. In the first stage of a multiple stage joining process, data from the first data stream can be acquired (e.g., accessed, read, pulled, etc.) at operation 232. At operation 233 data from the second data stream can be acquired (e.g., accessed, read, pulled, etc.).

At operation 234 data from the first data stream and data from the second data stream can be evaluated to determine if the data matches using a first time period. For example, data matches if the time associated with the data being matched falls within a first time interval of multiple time periods. In accordance with some aspects of the subject matter described herein the first interval is a shorter interval. In response to determining that data from the first stream and data from the second stream match, output data (the result of the join) can be generated at operation 238. In response to determining that data from the first stream and data from the second stream do not match, that is, for example, their associated times fall outside of the first interval, the non-matching data from data stream 2 can be held at operation 235.

In the second stage of the joining process, unmatched data from the first data stream and unmatched data from the second data stream can be matched using the second (e.g., possibly longer) time period. Data from stream 1 can be re-read (re-pulled) with an intentional delay at operation 242. At operation 236 data re-read from the first data stream and data that was held at operation 235 from the second data stream can be evaluated to determine if the data matches using a second time period. For example, data matches if the associated times of the data being matched falls within the second, specified interval of the multiple time periods. In accordance with some aspects of the subject matter described herein the second interval is a longer interval.

In response to determining that data re-read from the first stream and data held from the second stream match, output data (the result of the join) can be generated at operation 238. Processing can continue at operations 232 and 233. In response to determining that data from the first stream and data from the second stream do not match, that is, for example, their timestamps fall outside of the second interval, the non-matching data from data stream 2 can be discarded at operation 240. Processing can continue at operations 232 and 233. It will be appreciated that although only two stages are depicted in FIG. 2c, the contemplated subject matter is not so limited. This process or portions thereof can be repeated for any number of stages.

A real-world example is now described. Suppose data from the first data stream represents ads displayed to users. Suppose data from the second data stream represents click events (i.e., the user clicks on the ad). Suppose the first time period selected is five minutes. The ad data is acquired. The click data is acquired. The data is evaluated to see if it matches. Any click event that matches up with an ad display in the first five minutes can result in an output being produced. To do so, 5 minutes worth of ads can be held. If there are any matches, output is produced. There will in all likelihood be data that does not match. In particular, it is likely that some clicks will not match. The reason that a click does not match an ad is because the ad occurred more than 5 minutes before. The unmatched clicks are clicks that occurred more than 5 minutes after the ad was displayed. The number of unmatched clicks would be expected to be very small.

The unmatched clicks can be matched against the ads where the ads are re-acquired from the data stream 1 with a delay (e.g, a one hour delay). The ads and the clicks may still not match. For example, the ads and the clicks may not match because the click occurred more than one hour after the ad was displayed or because the corresponding click was not held (e.g., because the click occurred less than 5 minutes after the ad was displayed). If the ad was clicked on before 5 minutes operation 234 would have handled it. Operation 236 will only pick up the clicks that occurred between 5 minutes and one hour. The amount of data held in memory or in storage is very small (5 minutes worth of ads and non-matching clicks). A traditional system would hold an hour's worth of ads. Suppose the second time period selected is three hours. Unmatched data (clicks and ads) can be re-ingested with a 3 hour delay and joined to produce output.

In conclusion, described herein includes a system comprising at least one processor, a memory connected to the at least one processor and at least one program module loaded into the memory, the at least one program module comprising a streaming join module that analyzes at least one join condition for joining data pulled from a first data stream and data pulled from a second data stream and generates, based on analysis of the at least one join condition, an order or sequence in which pull requests are sent to the first and second data streams based on a time associated with the data from the first data stream and a time associated with the data from the second data stream. The system may comprise at least one program module that generates an allowable time range for joinable data from the analysis of the at least one join condition. The system may comprise at least one program module that generates a lower boundary of the allowable time range, the lower boundary comprising a minimal time variance for the joinable data, pulls data from the first data stream, and/or records in the memory or elsewhere the time associated with the data from the first data stream and then pulls data from the second data stream.

The system may comprise at least one program module that determines that the pulled data from the second data stream is potentially joinable with the pulled data from the first data stream by determining that the time associated with the data from the second stream is less than a difference of the recorded time and the minimal time variance. The system may comprise at least one program module that pulls additional data from the first data stream in response to determining that the pulled data from the second data stream is not joinable with the pulled data from the first data stream, and/or determines that the pulled data from the second data stream is not joinable with the pulled data from the first data stream by determining that the time associated with the data from the second stream is not less than a difference of the recorded time and the minimal time variance. The system may comprise at least one program module that determines from the analysis of the at least one join condition that to produce output, data from the first data stream and data from the second data stream is required. The system may comprise at least one program module that, in response to determining that no output can be produced because no potentially joinable data from the second data stream has been pulled, stops pulling data from the first data stream and starts pulling data from the second data stream. The system may comprise at least one program module that, in response to determining that no output can be produced because no potentially joinable data from the first data stream has been pulled, stops pulling data from the second data stream and starts pulling data from the first data stream.

The system of claim 1 may comprise at least one program module that determines from the analysis of the at least one join condition, a first time interval and a second time interval and in response to determining that the time associated with the data from the first data stream and the time associated with the data from the second data stream does fall within the first time interval, retains non-matching data from the second data stream. The system may comprise at least one program module that determines from the analysis of the at least one join condition a first time interval and a second time interval and in response to determining that the time associated with the data from the first data stream and the time associated with recorded data from the second data stream fall within the second time interval, discards non-matching data from the second data stream.

Disclosed is a method comprising analyzing by a processor of a computing device at least one join condition for joining data pulled from a first data stream and data pulled from a second data stream in a stream processing system and generating, based on analysis of the at least one join condition, an order in which pull requests are sent to the first and second data streams based on a time associated with the data from the first data stream and a time associated with the data from the second data stream. The method may generate an allowable time range for joinable data from the analysis of the at least one join condition, generate a lower boundary of the allowable time range, the lower boundary comprising a minimal time variance for the joinable data, pull data from the first data stream, record in the memory or elsewhere the time associated with the data from the first data stream and pull data from the second data stream. The method may determine that the pulled data from the second data stream is potentially joinable with the pulled data from the first data stream by determining that the time associated with the data from the second stream is less than a difference of the recorded time and the minimal time variance.

The method may pull additional data from the first data stream in response to determining that the pulled data from the second data stream is not joinable with the pulled data from the first data stream and determine that the data pulled from the second data stream is not joinable with the pulled data from the first data stream by determining that the time associated with the data from the second stream is not less than a difference of the recorded time and the minimal time variance. The method may determine from the analysis of the at least one join condition that to produce output, data from the first data stream and data from the second data stream is required. The method may, in response to determining that no output can be produced because no potentially joinable data from the second data stream has been pulled, cease to pull data from the first data stream and start to pulls data from the second data stream with an intentional delay. The method may, in response to determining that no output can be produced because no potentially joinable data from the first data stream has been pulled, cease pulling data from the second data stream and pull data from the first data stream. The method may determine from the analysis of the at least one join condition, a first time interval and a second time interval and in response to determining that a time associated with the data from the first data stream and the time associated with the data from the second data stream fall within the first time interval, retain non-matching data from the second data stream. The method may determine from the analysis of the at least one join condition a first time interval and a second time interval and may in response to determining that a time associated with the data from the first data stream and the time associated with recorded data from the second data stream fall within the second time interval, discard non-matching data from the second data stream.

Disclosed is a computer-readable storage medium comprising computer-readable instructions which when executed cause at least one processor of a computing device to analyze at least one join condition for joining data pulled from a first data stream and data pulled from a second data stream. Further instructions may generate, based on analysis of the at least one join condition, an order in which pull requests are sent to the first and second data streams based on a time associated with the data from the first data stream and a time associated with the data from the second data stream. Further instructions may determine from the analysis of the at least one join condition, a first time interval and a second time interval. Further instructions may in response to determining that the time associated with the data from the first data stream and the time associated with the data from the second data stream fall within the first time interval, retain non-matching data from the second data stream. Further instructions may in response to determining that the time associated with the data from the first data stream and the time associated with recorded data from the second data stream fall within the second time interval, discard non-matching data from the second data stream.

Example of a Suitable Computing Environment

Figure 3:
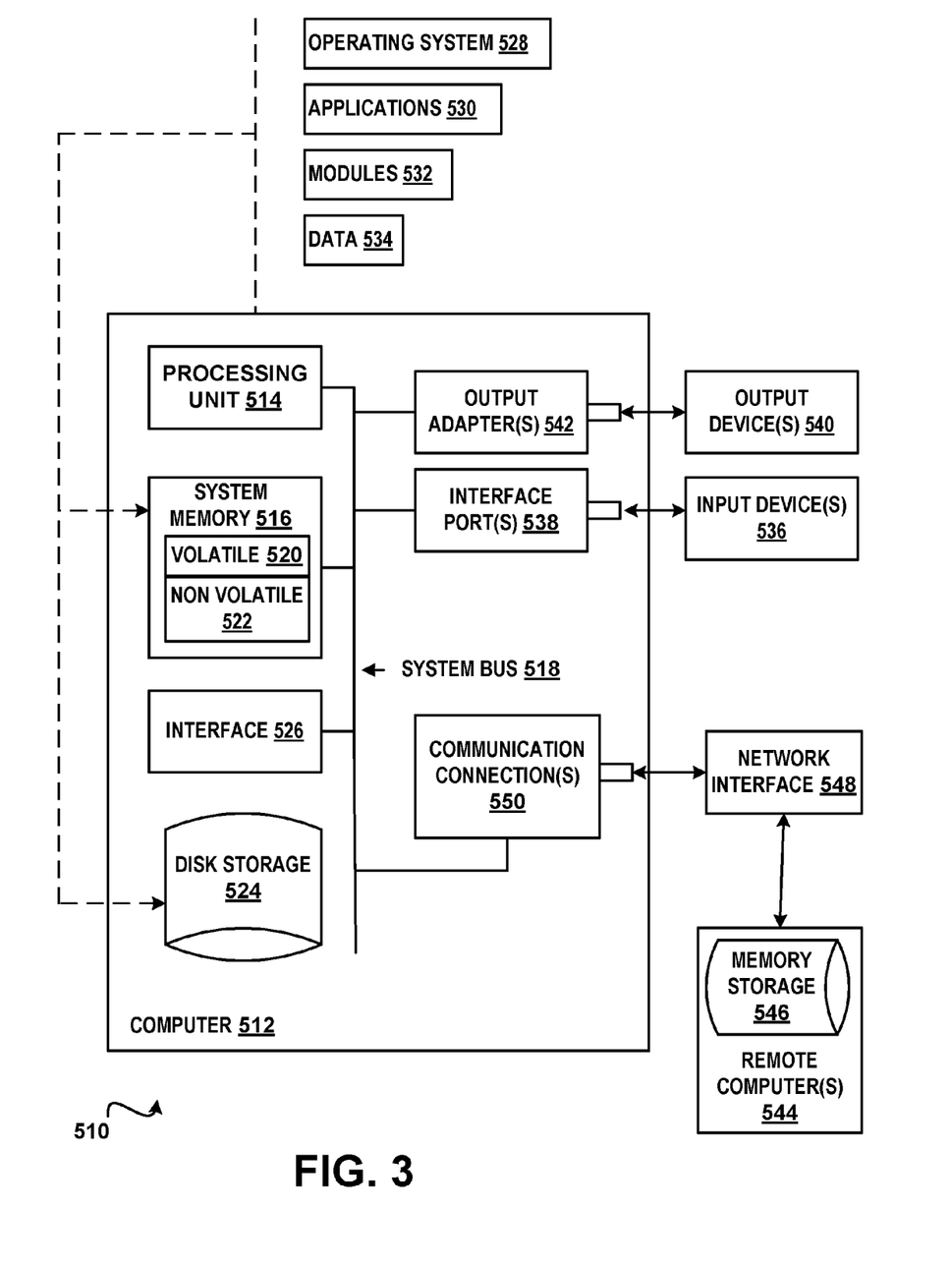
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   at least one processor; and
   a memory connected to the at least one processor;
   the at least one processor configured to perform actions that:
   analyzes at least one join condition for joining data pulled from a first data stream and data pulled from a second data stream, the at least one join condition indicates how the data in the first data stream and the data in the second data stream are to be joined;
   based on the analysis of the at least one join condition, determines an allowable time range in which to perform the join where data from the first data stream and the second data stream satisfy the join condition; and
   generates an order in which pull requests are sent to the first data stream and second data streams so that data from the first data stream and the second data stream are joined within the allowable time range, the order based on a time associated with the data from the first data stream and a time associated with the data from the second data stream.

2. The system of claim 1, wherein the at least one processor is further configured to perform actions that:
   generates a lower boundary of the allowable time range, the lower boundary comprising a minimal time variance for the joinable data;
   pulls data from the first data stream;
   records in the memory the time associated with the data from the first data stream; and
   pulls data from the second data stream.

3. The system of claim 2, wherein the at least one processor is further configured to perform actions that:
   determines that the pulled data from the second data stream is potentially joinable with the pulled data from the first data stream by determining that the time associated with the data from the second data stream is less than a difference of the recorded time and the minimal time variance.

4. The system of claim 2, wherein the at least one processor is further configured to perform actions that:
   pulls additional data from the first data stream in response to determining that the pulled data from the second data stream is not joinable with the pulled data from the first data stream; and
   determines that the pulled data from the second data stream is not joinable with the pulled data from the first data stream by determining that the time associated with the data from the second data stream is not less than a difference of the recorded time and the minimal time variance.

5. The system of claim 1, wherein the at least one processor is further configured to perform actions that:
   determines from the analysis of the at least one join condition that to produce output, data from the first data stream and data from the second data stream is required.

6. The system of claim 5, wherein the at least one processor is further configured to perform actions that:
   in response to determining that no output can be produced because no potentially joinable data from the second data stream has been pulled, stops pulling data from the first data stream and starts pulling data from the second data stream.

7. The system of claim 5, wherein the at least one processor is further configured to perform actions that:
   in response to determining that no output can be produced because no potentially joinable data from the first data stream has been pulled, stops pulling data from the second data stream and starts pulling data from the first data stream.

8. The system of claim 1, wherein the at least one processor is further configured to perform actions that:
   determines from the analysis of the at least one join condition, a first time interval and a second time interval; and
   in response to determining that the time associated with the data from the first data stream and the time associated with the data from the second data stream does fall within the first time interval, retains non-matching data from the second data stream.

9. The system of claim 1, wherein the at least one processor is further configured to perform actions that:
   determines from the analysis of the at least one join condition a first time interval and a second time interval; and
   in response to determining that the time associated with the data from the first data stream and the time associated with recorded data from the second data stream fall within the second time interval, discards non-matching data from the second data stream.

10. A method comprising:
    analyzing by a processor of a computing device at least one join condition for joining data pulled from a first data stream and data pulled from a second data stream in a stream processing system, the at least one join condition indicates how the data in the first data stream and the data in the second data stream are to be joined;
    based on the analysis of the at least one join condition, determines an allowable time range in which to perform the join where data from the first data stream and the second data stream satisfy the join condition; and
    generating, based on analysis of the at least one join condition, an order in which pull requests are sent to the first data stream and second data streams so that data from the first data stream and the second data stream are joined within the allowable time range, the order based on a time associated with the data from the first data stream and a time associated with the data from the second data stream.

11. The method of claim 10, further comprising:
generating a lower boundary of the allowable time range, the lower boundary comprising a minimal time variance for the joinable data;
pulling data from the first data stream;
recording in the memory the time associated with the data from the first data stream; and
pulling data from the second data stream.

12. The method of claim 11, further comprising:
determining that the pulled data from the second data stream is potentially joinable with the pulled data from the first data stream by determining that the time associated with the data from the second data stream is less than a difference of the recorded time and the minimal time variance.

13. The method of claim 11, further comprising:
pulling additional data from the first data stream in response to determining that the pulled data from the second data stream is not joinable with the pulled data from the first data stream; and
determining that the data pulled from the second data stream is not joinable with the pulled data from the first data stream by determining that the time associated with the data from the second data stream is not less than a difference of the recorded time and the minimal time variance.

14. The method of claim 10, further comprising:
determining from the analysis of the at least one join condition that to produce output, data from the first data stream and data from the second data stream is required.

15. The method of claim 14, further comprising:
in response to determining that no output can be produced because no potentially joinable data from the second data stream has been pulled, ceasing to pull data from the first data stream and starting to pulls data from the second data stream with an intentional delay.

16. The method of claim 14, further comprising:
in response to determining that no output can be produced because no potentially joinable data from the first data stream has been pulled, ceasing to pulling data from the second data stream and pulling data from the first data stream.

17. The method of claim 10, further comprising:
determining from the analysis of the at least one join condition, a first time interval and a second time interval; and
in response to determining that a time associated with the data from the first data stream and the time associated with the data from the second data stream fall within the first time interval, retain non-matching data from the second data stream.

18. The method of claim 17, further comprising:
determining from the analysis of the at least one join condition a first time interval and a second time interval; and
in response to determining that a time associated with the data from the first data stream and the time associated with recorded data from the second data stream fall within the second time interval, discarding non-matching data from the second data stream.

19. A device, comprising:
at least one processor and a memory;
the at least one processor configured to:
analyze at least one join condition for joining data pulled from a first data stream and data pulled from a second data stream, the at least one join condition indicates how the data in the first data stream and the data in the second data stream are to be joined;
based on the analysis of the at least one join condition, determines an allowable time range in which to perform the join where data from the first data stream and the second data stream satisfy the join condition; and
generate an order in which pull requests are sent to the first and second data stream so that data from the first data stream and the second data stream are joined within the allowable time range, the order based on a time associated with the data from the first data stream and a time associated with the data from the second data stream.

20. The device of claim 19, wherein the at least one processor is further configured to:
determine from the analysis of the at least one join condition, a first time interval and a second time interval;
in response to determining that the time associated with the data from the first data stream and the time associated with the data from the second data stream fall within the first time interval, retain non-matching data from the second data stream; and
in response to determining that the time associated with the data from the first data stream and the time associated with recorded data from the second data stream fall within the second time interval, discard non-matching data from the second data stream.

* * * * *